United States Patent [19]

Denne et al.

[11] Patent Number: 5,524,593
[45] Date of Patent: Jun. 11, 1996

[54] ELECTROPNEUMATIC CONTROL VALVE

[75] Inventors: Albert Denne, Meerbusch; Werner Buse, Kaarst; Gerhard Parthe, Korschenbroich, all of Germany

[73] Assignee: Pierburg GmbH, Neuss, Germany

[21] Appl. No.: 442,673

[22] Filed: May 17, 1995

Related U.S. Application Data

[63] Continuation of Ser. No. 289,847, Aug. 12, 1994, abandoned.

[30] Foreign Application Priority Data

Sep. 1, 1993 [DE] Germany .......... 43 29 396.4

[51] Int. Cl.⁶ .......................................... F02M 33/02
[52] U.S. Cl. .................. 123/520; 123/458; 123/463; 251/129.03
[58] Field of Search ............................. 123/520, 518, 123/516, 458, 521, 519, 198 D, 463; 251/129.03, 14

[56] References Cited

U.S. PATENT DOCUMENTS

| | | | |
|---|---|---|---|
| 4,366,835 | 1/1983 | Akagi | 251/129.03 |
| 4,703,737 | 11/1987 | Cook | 123/520 |
| 4,944,276 | 7/1990 | House | 123/520 |
| 4,986,246 | 1/1991 | Kessler de Vivie | 123/520 |
| 5,069,188 | 12/1991 | Cook | 123/520 |
| 5,083,546 | 1/1992 | Detweiler | 123/520 |
| 5,178,116 | 1/1993 | Fehrendach | 123/520 |
| 5,277,167 | 1/1994 | Delano | 123/520 |
| 5,383,437 | 1/1995 | Cook | 123/520 |

FOREIGN PATENT DOCUMENTS

| | | |
|---|---|---|
| 0325698 | 2/1992 | European Pat. Off. . |
| 3519292 | 4/1988 | Germany . |
| 3907408 | 2/1990 | Germany . |
| 3844057 | 5/1990 | Germany . |
| 4003036 | 11/1990 | Germany . |

*Primary Examiner*—Carl S. Miller
*Attorney, Agent, or Firm*—Ladas & Parry

[57] ABSTRACT

An electropneumatic control valve for regeneration of a fuel absorption element by supply of air to the absorption element includes a valve comprised of a valve seat member (5) and a valve sealing member (4). The valve seat member is displaceable under the action of a pneumatic control section (2B) while the valve sealing member (4) is displaceable under the control of an electromagnetic control section (2A). The operation of the valve members (4, 5), takes place independently of one another by the respective control sections. During strong suction pressures in connector (11), valve seat member (5) is lowered and during the opening stroke of the valve sealing member (4) a minimum opening is provided whereas during low suction pressure at connector (11) the valve seat member (5) is raised and during the opening stroke of the valve sealing member (4) a maximum valve opening is produced. The valve members are slidably and guidably supported in a fixed sleeve (6) provided with calibrated openings (15).

10 Claims, 1 Drawing Sheet

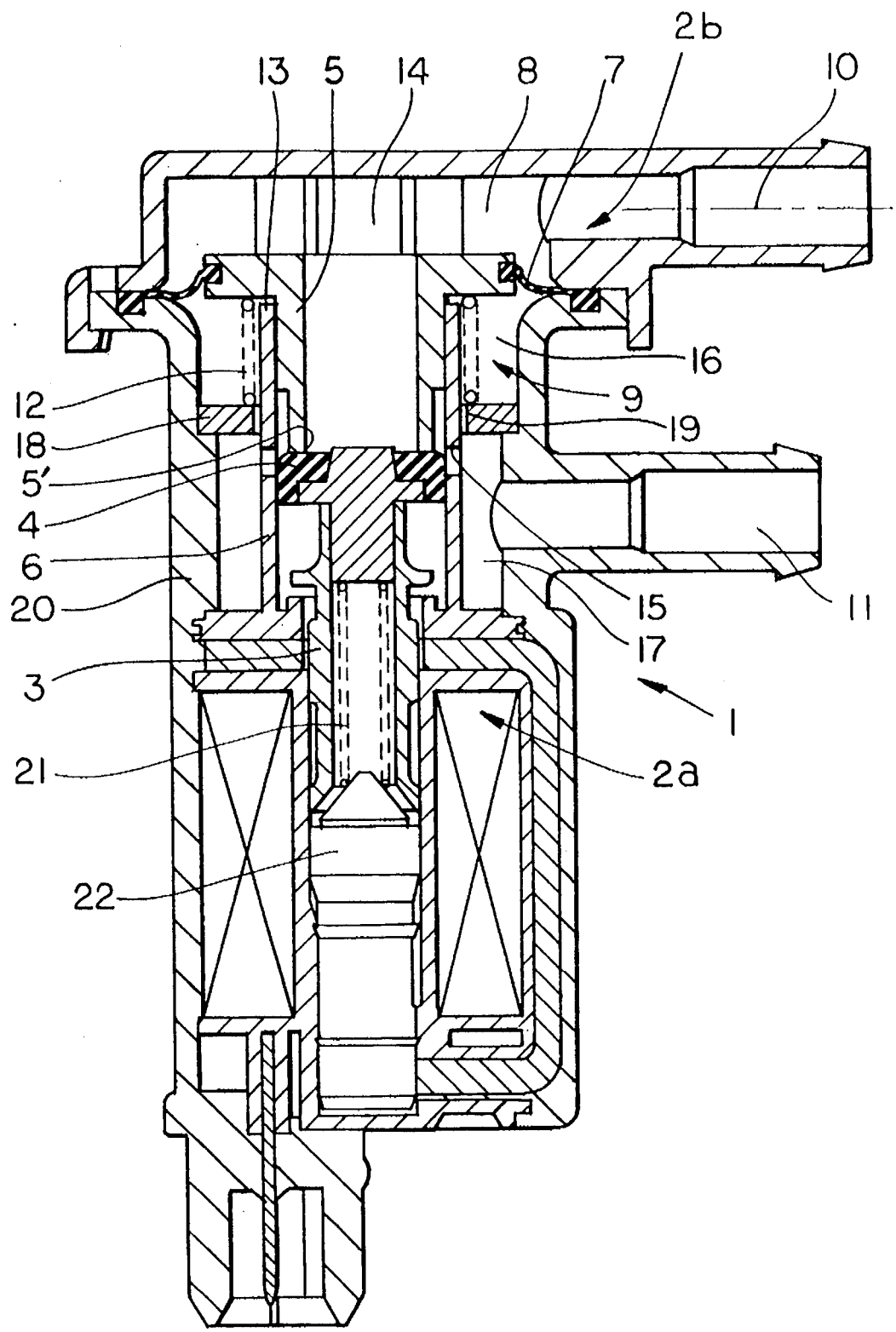

ELECTROPNEUMATIC CONTROL VALVE

This is a continuation of application Ser. No. 08/289,847 filed on Aug. 12, 1994 abandoned.

FIELD OF THE INVENTION

The invention relates to an electropneumatic control valve for controlling air flow, particularly for regeneration of an absorption element for fuel supply to an internal combustion engine.

BACKGROUND AND PRIOR ART

Such control valves are necessary for the regeneration of the absorption element through which volatile fuel passes during the normal operation of an internal combustion engine. The regeneration of the absorption element is achieved by passing fresh air therethrough. DE-PS 38 02 664 discloses such a control valve which consists of an electromagnetic valve and a pneumatic valve connected in series, controlled as a function of the intake suction pressure of the internal combustion engine.

This control valve has the disadvantage that an optimal regeneration of the absorption element cannot be obtained with optimal operating behavior of the internal combustion engine even for a substantially closed pneumatic valve, since the cyclically controlled electromagnetic valve is unsuitable for the extremely sensitive control of air flow due to too high an amplitude of the valve stroke and the effect of the mass of the biasing spring at the given frequency.

Additionally, the operation of the pneumatic valve is dependent on atmospheric pressure with respect to its control behavior, which makes it highly sensitive.

SUMMARY OF THE INVENTION

An object of the invention is to provide an electropneumatic valve construction by means of which an improved control of the regeneration air to an absorption element can be obtained.

According to the invention, an electromagnetic control means and a pneumatic control means are provided and the valve means which controls air flow in an air passage between a suction air source and the absorption element comprises a displaceable valve seat member and a displaceable valve sealing member, each respectively connected to one of said control means for being independently operated thereby.

In further accordance with the invention, a guide sleeve slidably and guidably supports both displaceable valve members and is provided with calibrated openings for air flow. The air passes through the valve means and the calibrated openings to a connector adapted for connection to the intake manifold of the internal combustion engine serving as a suction source.

In further accordance with the invention, the pneumatic control means comprises a membrane separating first and second chambers, the first chamber being connected to the air passage and to a further connector adapted for connection to the absorption element while the second chamber is in communication with suction source.

In further accordance with the invention, a dividing wall is disposed in the second chamber between the membrane and the further connection and defines first and second sub-divided chambers on opposite sides thereof. The first sub-divided chamber is bounded by the membrane and the second sub-divided chamber communicates with the calibrated openings in the sleeve and with further connection connected to the suction source. A calibrated aperture means connects the first and second sub-divided chambers.

BRIEF DESCRIPTION OF THE FIGURE OF THE DRAWING

The sole FIGURE of the drawing is a cross-sectional view through an electropneumatic control valve according to the invention.

DETAILED DESCRIPTION OF A PREFERRED EMBODIMENT

In the drawing, there is shown an electropneumatic control valve 1 which comprises an electromagnetic control section 2A and a pneumatic control section 2B. The electromagnetic control section 2A comprises a displaceable armature 3 carrying a valve sealing member 4. The armature 3 is cyclically displaced as a function of control signals supplied to the electromagnetic control section 2A by an electronic control means (not shown) to produce opening and closing operations of the valve 1 as will be explained in greater detail later.

A displaceable valve seat member 5 has a lower end 5' facing the sealing member 4 to form a seat therefor. The seat member 5 and the sealing member 4 are slidably and guidably supported in a guide sleeve 6 and collectively form the valve proper.

The pneumatic control section 2B includes a membrane 7 connected to valve seat member 5, the membrane 7 separating first and second chambers 8 and 9 from one another, chamber 8 being upstream of the valve and chamber 9 downstream of the valve. Chamber 8 communicates with a connector 10 adapted for connection to the fuel absorption element and chamber 9 communicates with a further connector 11 adapted for connection with the intake manifold of the internal combustion engine. A spring 12 is disposed in chamber 9 and bears against valve seat member 5 to urge the seat member 5 away from the sealing member 4 thereby tending to open the valve and bias membrane 7 in the direction of chamber 8. An upper edge 13 of the guide sleeve 6 serves as a stop to limit displacement of the valve seat member 5 and thereby the membrane 7 downwardly whereas ribs 14 fixed to the housing 20 of the valve 1 limit upwards displacement of the valve seat member 5.

The guide sleeve 6 has calibration openings 15 located downstream of the valve seat member 5 and openings 15 throttle air flow in the air passage through the valve from the connector 10 to the connector 11. Hence, membrane 7 is subjected to a stabilized inlet pressure which is not significantly influenced by the valve operation.

A dividing wall 18 is disposed in chamber 9 to form sub-divided chambers 16 and 17. Chamber 16 is bounded by membrane 7 and chamber 17 communicates with calibration openings 15 and connector 11. Chambers 16 and 17 are connected by a calibrated aperture means 19. The calibrated aperture means 19 is formed as an annular gap between guide sleeve 6 and dividing wall 18. Alternatively, the calibrated aperture means could be formed entirely in the dividing wall 18 or in the surrounding wall of the housing 20 or partly in each.

In operation, the connector 11 is connected to the intake manifold of the internal combustion engine and the connector 10 is connected to the fuel absorption element. Air is suctioned through the air passage in the valve 1, when the valve is opened, causing air to flow through the absorption element to achieve regeneration thereof. During periods of large air flow to the engine and consequently of relatively weak suction pressure at connector 11, the valve seat member 5 is urged upwardly by spring 12 to its upper limit position by ribs 14.

The valve 1 is closed by contact of sealing member 4 against the lower edge 5A of the seat member 5 under the bias of spring 21 of the electromagnetic valve section 2A during cyclical operation thereof when no activation signal is sent to valve section 2A. In this position, the air gap between magnetic core 22 and armature 3 is a maximum.

When an activation signal is received by the electromagnetic valve section 2A, the valve 1 opens and the distance between the valve sealing member 4 and the valve seat member 5 reaches a maximum value so that a sufficiently high quantity of air flows through the valve and the absorption element, during a relatively long open state of the valve even though the suction pressure is relatively weak.

During idle or low load of the internal combustion engine strong suction pressure is developed causing membrane 7 and thereby valve seat member 5 to be lowered to its limit position defined by the upper edge 13 of sleeve 6. Thereby in the inactive state of the electromagnetic valve section 2A, the air gap between armature 3 and magnetic core 22 is a minimum. When the electromagnetic valve section 2A is activated during a relatively short open state, the distance between the valve seat member 5 and the sealing member 4 is a minimum. Thereby a sensitive control of the air flow through the valve 1 is obtained.

It is a feature that the armature 3 operates with maximum force when the valve opening is a minimum whereas the force is minimum when the valve opening is a maximum. Thereby the closing force of spring 21 can be designed accordingly.

The control valve of the invention makes it possible to achieve precise control of the quantity of regenerating air flowing through the absorption element for all states of operation of the internal combustion engine.

Thus, as evident from the above, the invention provides the valve means formed by the seat member 5 and the sealing member 4 in the air passage between the connector 11 and the connector 10 to control flow of air in said air passage. The electromagnetic control section 2A operating the sealing member 4 while the pneumatic control section 2B operates the valve seat member 5, the operation of the two valve members by their respective control sections being independent of one another.

Although the invention has been described in relation to a specific embodiment thereof, it would become apparent to those skilled in the art that numerous modifications and variations can be made within the scope and spirit of the invention as defined in the attached claims.

What is claimed is:

1. A control valve for regeneration of a fuel absorption element by air flow through the absorption element, said valve comprising:

valve means for controlling flow of air in an air passage connectable to an air source and a fuel absorption element, electromagnetic control means connected to said valve means for regulating said air passage, and pneumatic control means connected to said valve means for regulating said air passage independently of said electromagnetic control means, said valve means comprising a displaceable valve seat member having a valve seat in said air passage and a displaceable valve sealing member facing said valve seat member to open and close said air passage, said displaceable valve seat member and said displaceable valve sealing member each being connected to a respective one of said control means for being independently operated thereby, and a guide sleeve slidably and guidably supporting said valve seat member and said valve sealing member.

2. An electropneumatic control valve as claimed in claim 1, wherein said pneumatic control means comprises a membrane separating first and second chambers, said first chamber being connected to said passage and connectable to a fuel absorption element, said second chamber being connected to said air supply which comprises a suction source to produce air flow from said first chamber to said second chamber via said sleeve under control of said valve means, said sleeve having a calibrated opening for passage of air through the sleeve.

3. An electropneumatic control valve as claimed in claim 2, comprising a dividing wall in said second chamber between said membrane and a connector for connection to the suction source, said dividing wall defining first and second sub-divided chambers on opposite sides thereof and a calibrated aperture means joining said first and second subdivided chambers.

4. An electropneumatic control valve as claimed in claim 3, wherein the first sub-divided chamber is bounded by said membrane and said second sub-divided chamber is connected to said connector.

5. An electropneumatic control valve as claimed in claim 4, wherein said calibration opening in said sleeve opens into said second sub-divided chamber.

6. An electropneumatic control valve as claimed in claim 5, wherein said calibrated aperture means is provided in said dividing wall.

7. An electropneumatic control valve as claimed in claim 5, comprising a housing containing said sleeve, said chambers, and said dividing wall, said calibrated aperture means being provided between said dividing wall and said housing.

8. An electropneumatic control valve as claimed in claim 1, wherein said sleeve has an end facing said valve seat member to limit said valve seat member in one direction of displacement thereof.

9. An electropneumatic control valve as claimed in claim 8, comprising fixed means for limiting said valve seat member in the opposite direction of displacement thereof.

10. An electropneumatic control valve as claimed 1, wherein said air source comprises a source of suction air.

* * * * *